April 21, 1953 P. L. SCHNEIDER 2,636,092
FOOT-OPERATED DIRECTION SIGNAL SWITCH
Filed March 16, 1950 2 SHEETS—SHEET 1
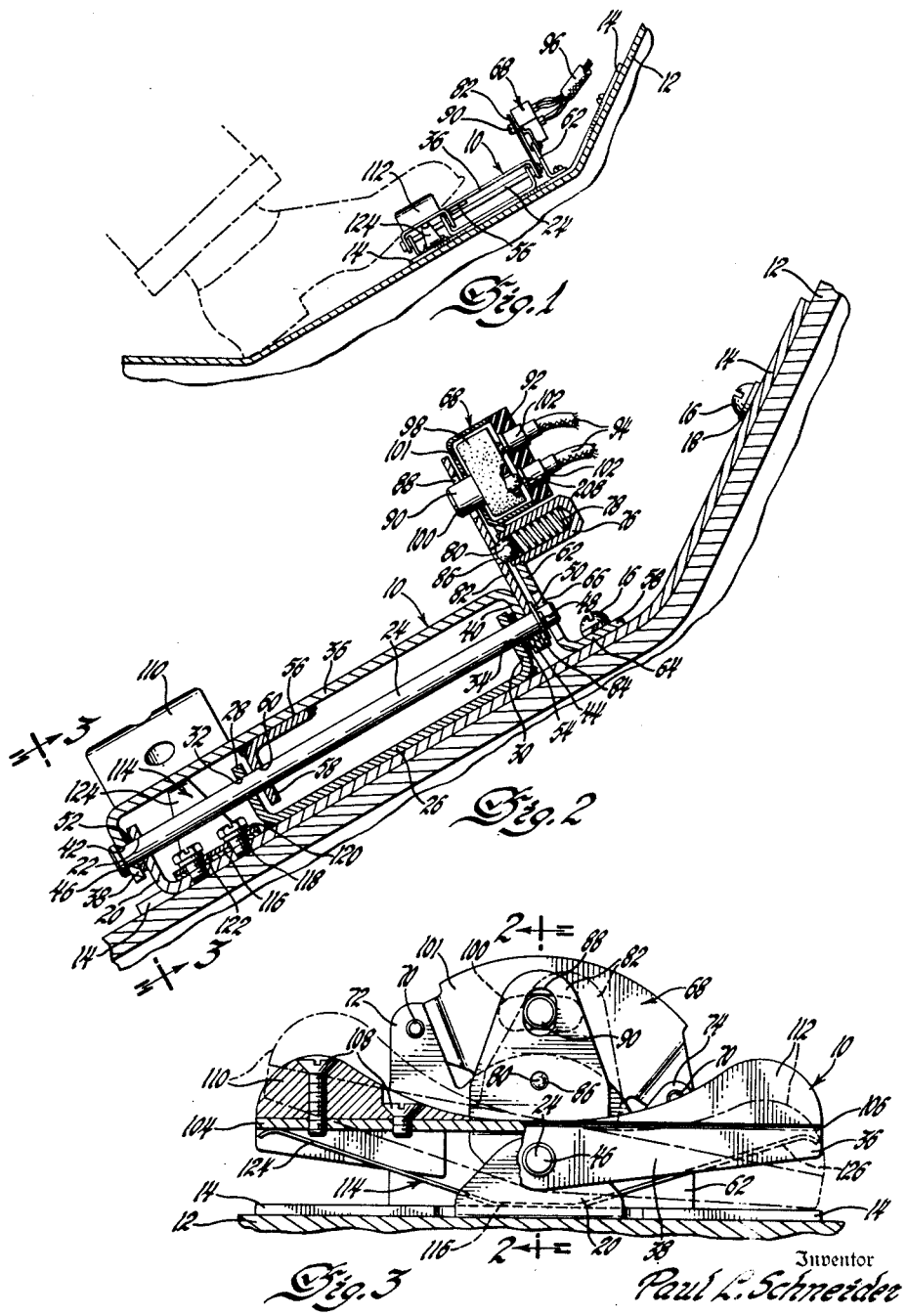
Inventor
Paul L. Schneider
By Willits, Helwig & Baillio
Attorneys April 21, 1953      P. L. SCHNEIDER      2,636,092
FOOT-OPERATED DIRECTION SIGNAL SWITCH Filed March 16, 1950      2 SHEETS—SHEET 2

Inventor
Paul L. Schneider
By Willits, Helwig & Baillio
Attorneys

Patented Apr. 21, 1953

2,636,092

UNITED STATES PATENT OFFICE 2,636,092

FOOT-OPERATED DIRECTION SIGNAL SWITCH

Paul L. Schneider, Anderson, Ind., assignor to General Motors Corporation, Detroit, Mich., a corporation of Delaware Application March 16, 1950, Serial No. 150,086

9 Claims. (Cl. 200—59)

1

This invention relates to motor vehicle direction signaling systems having a plurality of signaling circuits and has particular reference to a foot-operated direction signal switch.

The invention resides in a switch mechanism having a base member attachable to a vehicle floor or toe panel and a pedal pivotally mounted on the base member for limited clockwise or counterclockwise rotation with respect thereto. The pedal carries an arm which positions a sliding contact of a multiple switch for energizing the respective direction signaling circuits.

In view of the recent tendency in automobile design to eliminate the clutch pedal, this invention is particularly advantageous to provide direction indicating signals by a slight movement of the left foot, thereby freeing both hands to steer the vehicle, this being particularly desirable when turning first in one direction and then another in rapid sequence.

For a better understanding of the nature and objects of the invention reference is made to the specification wherein there is described the preferred embodiment of the invention illustrated in the accompanying drawings, in which:

Figure 1 is a side view of a foot-operated direction signal switch mounted on the toe panel portion of the floor, shown in section, of a motor vehicle;

Figure 2 is a sectional view of the switch assembly approximately along the line 2—2 of Figure 3;

Figure 3 is an end view, with parts broken away and in section, along the line 3—3 of Figure 2, showing the positions of switch members in the neutral and one of the operative positions;

Figure 4:
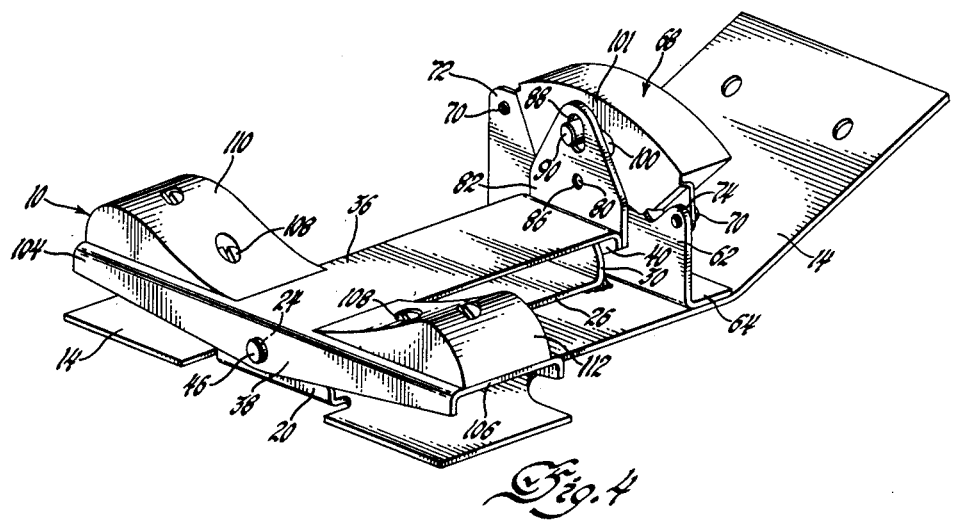
Figure 4 is a perspective view of the switch assembly shown in Figures 1, 2 and 3.

Referring to the drawings, the foot-operated direction signal switch assembly, indicated generally by 10, is mounted upon the toe panel 12 in the driver's compartment of a motor vehicle. This assembly, as best shown in Figures 2, 3 and 4 includes a base member 14, which is shown as bent to conform to the contour of the toe panel and secured thereto preferably by screws 16 and lock washers 18.

A central portion of the rearward end of the base member is bent to provide an upwardly extending flange 20 having an opening 22 in which the rearward end of a pin 24 is journaled. This pin has its central portion and forward end supported by the channel-shaped bracket 26

2 which is seated upon and preferably welded to the base member 14, the upturned flanges 28 and 30 of this channel having openings 32 and 34, respectively, providing bearings for the pin.

A generally T-shaped switch lever or pedal 36 has downwardly extending flanges 38 and 40 at its rearward and forward ends, respectively. This pedal is pivotally mounted on the pin 24 by providing flanges 38 and 40 with openings 42 and 44 through which the pin 24 is inserted. The shaft has its rearward end provided with an enlarged head 46 and its forward end provided with a cotter pin 48 and washer 50 to secure the shaft axially within these flange openings. Washers 52 and 54 are positioned on the shaft between flanges 38 and 20 and between flanges 30 and 40, respectively, to facilitate smooth and quiet operation of the pedal. An L-shaped supporting member 56 is secured to the lower surface of the central portion of the pedal 36 by welding or other appropriate means, the downwardly extending leg 58 having a hole 60 in which the pin rides. This L-shaped member lends structural rigidity to the pedal, preventing its downward distortion and binding with the pin or flanges 20 and 30.

A switch bracket 62, positioned forward of the pedal, has a base flange 64 secured to the base member, preferably by screws 16. Near the base of the bracket is an aperture 66 through which the forward end of the pin 24 projects. A conventional type of multiple switch 68, which will subsequently be described in greater detail, is mounted by screws 70 or other appropriate means to the legs 72 and 74 of the bracket 62, as shown in Figure 4. The central portion of this bracket supports a retainer 76 for a helical compression spring 78, which rearwardly biases a ball 80.

Rigidly secured, preferably by welding, to the downwardly extending flange 40 at the forward end of the pedal 36 is a switch plate 82 having tapered upper and lower portions, the latter being provided with an opening 84, substantially registering with opening 44 in flange 40, in which the forward end of the pin is positioned. In the approximate center of the switch plate is a small opening 86, in which the ball 80 is resiliently seated by the spring 78 when the switch is in the neutral position, indicated by the solid lines in Figure 3, the opening 86 together with the spring-biased ball thereby forming a detent mechanism. Near the upper end of the switch plate 82 is an oblong vertical slot 88 through which a switch operating arm 90 projects. The switch plate is therefore adapted for limited pivotal movement to actuate the switch 68 by transversely sliding the switch arm 90, thereby connecting the signaling circuits to a source of current, usually the vehicle battery.

The switch, as best shown in Figure 2, is a type commonly used with direction signal operating mechanisms and includes a terminal plate 92 of insulating material connected to the leads 94 of the cable 96. This terminal plate forms one side of the switch enclosure in which there is positioned a sliding block 98 of insulating material having bridging bars 208, 210 and 212 recessed in its inner face and the switch arm extending rearwardly from its outer face through the transverse slot 100 in the switch casing 101. These bridging bars bridge the terminal contacts, which may be of any suitable type such as connectors or rivets 102 having a recess adapted for attachment to leads 94, to energize and de-energize the circuits of the signaling system.

Mounted upon the upper surface of the legs 104 and 106 of the pedal 36 by screws 108 are left and right pedal pads 110 and 112, respectively, which are shown as having curved upper surfaces to provide ready positioning of the foot thereon.

A flat spring 114, preferably of tempered spring steel, has a base portion 116 seated upon the base member 14 and secured thereto by screws 118 and lock washers 120. A spring plate 122 is provided between the heads of the screws and the spring base to serve as a stiffener for the spring. The spring legs 124 and 126, extending outwardly and laterally from the base portion, have curved ends which project against the lower surface of the arms 104 and 106 of the pedal 36, thereby exerting upward pressure against these arms to cause smooth and positive operation of the switching device. Upon release of the pedal from an operative position, this spring returns the switch arm 90 to the neutral position.

In operation one or the other of the pedal arms 104 and 106 is depressed by the left foot of the vehicle driver, thereby moving the pedal clockwise or counterclockwise to its extreme position to rotate the switch plate 82. The pedal position indicating a right turn is shown with broken lines in Figure 3. The switch plate simultaneously slides the switch arm either to the left or to the right in the transverse slot 100 in the rear wall of the switch casing, thereby actuating the switch and completing an electrical circuit to indicate a turn in the appropriate direction. The pedal plate 36 is automatically returned to the neutral position indicated with solid lines in Figure 3 by the action of the spring 114.

Figure 5:
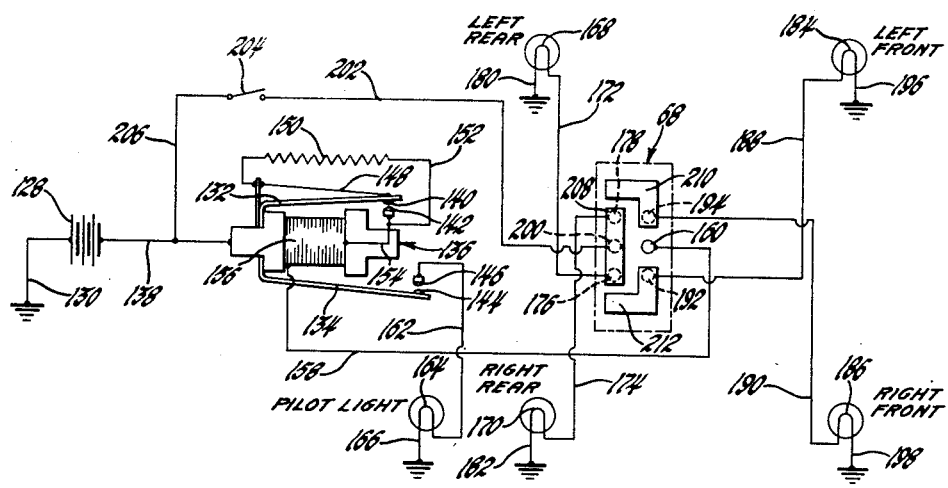
Figure 5 is a circuit diagram of the entire direction signaling system.

To provide a visual indication of the direction of turn contemplated by the operator of a vehicle the contact terminals of switch 68 are connected to a plurality of circuits of a signaling system, including right and left front and right and left rear signaling lamps. As shown in Figure 5 of the drawings, the system comprises a battery 128 having one terminal connected to ground by a conductor 130 and the other terminal connected to the hinged armatures 132 and 134 of a solenoid-operated flasher 136 by conductor 138. The armature 132 is provided with a contact 140 which is normally out of engagement with fixed contact 142. The armature 134 is similarly provided with contact 144 which is also normally out of engagement with fixed contact 146. Armature 132 and contact 140 are connected by a conductor 148 of predetermined resistance which when not carrying current urges the armature 132 and the contact 140 to a position where engagement of contacts 140 and 142 is broken. Conductor 148 is connected to a resistor 150 which has its opposite terminal connected to the fixed contact 142 by a conductor 152. Contact 142 is also connected by a conductor 154 to one terminal of the solenoid coil 156. The other end of the solenoid coil is connected by a conductor 158 to a contact terminal 160 of the switch 68. Contact 146 is connected by a conductor 162 to the filament 164 of a pilot light mounted on the dash panel of the vehicle, the other end of the filament being connected by a conductor 166 to ground.

The left and right rear signaling lamps of the system have one side of their filaments 168 and 170 connected by conductors 172 and 174, respectively, to contact terminals 176 and 178 of the switch 68 and the other side of the filaments connected to ground by conductors 180 and 182. The left and right front signaling lamps of the system have one side of their filaments 184 and 186 connected by conductors 188 and 190, respectively, to terminals 192 and 194 of the switch 68, and the other side of filaments 184 and 186 are connected to ground by conductors 196 and 198. The remaining terminal 200 of switch 68 is connected by a conductor 202 to one terminal of a normally open switch 204, which is closed by operation of the brake pedal of the vehicle. The other terminal of switch 204 is connected by a conductor 206 to conductor 138. As heretofore described, the switch 68 is provided with a sliding block 98 which carries bridging bars 208, 210 and 212 for providing energization of the respective lamp filaments in accordance with the operation of the pedal 36.

Figure 5 shows the neutral position of the switch 68, the bridging contact bar 212 bridging contact terminals 176, 178 and 200. With the switch 68 in this position, the filaments 168 and 170 of the left and right rear signaling lamps, respectively, may be energized by the operation of the vehicle brake pedal closing switch 204, indicating to a following vehicle the intention of slowing the vehicle or coming to a stop. Current is carried to filaments 168 and 170 from the battery 128 through conductors 138 and 206, brake switch 204, conductor 202, terminal contact 200, bridging contact 208 and conductors 172 and 174.

To indicate a left turn the left pedal arm 104 is depressed, thereby rotating the pedal and the attached switch plate in a counterclockwise direction, viewing the switch operating mechanism from the rearward end. This simultaneously slides the switch arm 90 to the left, causing bridging contact 212 of switch 68 to bridge terminal contacts 160, 176 and 192 and bridging contact 208 to shift, unbridging contact terminal 176 but retaining bridging engagement with contact terminals 178 and 200. Bridging contact 210 is correspondingly moved out of engagement with terminal contact 194. With this switching arrangement a circuit is completed from the battery 128 to the left front and rear filaments 168 and 184 through conductor 138, armature 132, hot wire resistance conductor 148, resistor 150, conductors 152 and 154, solenoid coil 156, conductor 158, bridging contact 212, and conductors 172 and 188. Current passing through the hot wire resistor 148 causes it to heat and simultaneously expand permitting the magnetic force of solenoid coil 156 to attract armature 132 closing contact 140 on contact 142. This causes the current to by-pass hot wire 148 and resistor 150, permitting sufficient current to pass through the solenoid coil 156 to attract armature 134 and close contact 144 on contact 146, thereby completing a circuit from the battery 128, through conductor 138, armature 134, conductor 162 to the filament 164 of the pilot light to cause it to glow. With contact 140 of armature 132 closed on contact 142, thereby by-passing hot wire 148 and resistor 150, sufficient current flows in the aforementioned circuits to the left front and rear filaments 168 and 184 to cause them to glow, providing a signal light. As the by-passed hot wire cools, it contracts and urges the armature 132 to break the contact engagement between contacts 140 and 142, thereby placing resistor 150 back in the circuit and preventing sufficient current to flow to cause filaments 168 and 184 to be energized. With the flasher 136 in the circuits and operating as described, the left front and rear filaments provide flashing signals and the pilot light is illuminated during each period in which sufficient current passes in the circuits of filaments 168 and 184 to cause them to glow.

Applying the brakes when the switch is in this left-turn position closes switch 204, completing a circuit from the battery 128 through conductors 138 and 206, switch 204, conductor 202, bridging contact 208, conductor 174 to filament 170. The filament 170 will then receive a steady flow of current from the battery to provide a constant source of illumination for the right rear lamp, while the left front and rear lamps will be flashed on and off by the flasher 136.

To indicate a right turn, the right pedal arm 106 is depressed, as shown with broken lines in Figure 3, causing the pedal 36 and switch plate 82 to rotate in a clockwise direction and the switch pin to slide to the right, a circuit condition similar to that previously described for a left turn exists except that the bridging contact 210 of switch 68 bridges terminal contacts 160, 178 and 194 while bridging contact 208 engages contacts 176 and 200 and unbridges contact 178. Consequently the right front and rear lamps will be subject to intermittent flashing, and if the brake switch 204 is closed the left rear lamp filament will receive a constant flow of current and provide a steady glow signal.

While the described embodiment of the present invention constitutes a preferred form, it is to be understood that other forms might be adopted, all coming within the scope of the following claims.

I claim:

1. A foot-operated signal switch for use on the floor of an automotive vehicle and comprising a base member adapted to be secured to the vehicle floor, a pedal pivotally mounted on said base member and having a switch plate attached thereto, a multiple switch and a detent mechanism for indexing said switch plate in its neutral position mounted on the forward end of said base member, and a switch arm slidably operated by said switch plate for actuating the switch.

2. A foot-operated direction signal switch for use on the floor of an automotive vehicle comprising a base member adapted to be rigidly secured to the vehicle floor, a pin journaled in said base member, a multiple switch and an encased spring-biased ball mounted upon the forward end of said base member, a pedal pivotally mounted on said pin and having a switch plate attached to its forward end, said plate having an opening in which said spring-biased ball seats when the switch is in the neutral position, and a switch arm engageable by said switch plate for actuating the switch.

3. A direction signal switch for mounting on the toe-plate portion of the floor of an automotive vehicle for foot operation from a neutral to an indicating position and for automatic operation to said neutral position from said indicating position, which switch comprises a base member adapted to be rigidly secured to the floor, a switch and a detent mechanism secured to said base member, said switch being provided with a transversely slidable operating arm, a pin journaled in said base member, a pedal pivotally mounted on said pin and having transversely extending legs at its rearward end, a spring secured to said base member and projecting against the pedal legs, and, rigidly secured to and extending from said pedal plate, a switch plate engageable by said detent mechanism and having an opening to engage the operating arm of the switch.

4. A foot-operated direction signal device adapted to be mounted on the floor of an automotive vehicle and comprising a base member secured to said floor, a longitudinally extending pin rotatably supported on said base member, a multiple switch having a longitudinally extending, transversely slidable operating arm and an encased spring-biased ball supported on the forward portion of said base member, a pedal pivotally mounted on said pin for limited rotary movement and having legs laterally extending from its rearward portion, a switch plate secured to the forward end of said pedal and having its upper end engaging the switch operating arm and its central portion apertured to receive the spring-biased ball, thereby permitting the pivoting of the pedal to laterally position the switch arm and actuate the switch.

5. A foot-operated direction signal device for automotive vehicles adapted to be mounted on the toe panel portion of the vehicle floor for foot operation from a neutral to an indicating position and for automatic operation to said neutral position from said indicating position in response to pressure of a spring, which device comprises a base member rigidly secured to the floor, a multiple switch secured to a forward portion of said base member and having a rearwardly extending arm for operating said switch, a pedal with laterally extending legs at its rearward end pivotally mounted on the base member, a spring secured to said base member and projecting against the pedal legs, a switch plate rigidly secured to and extending upwardly from said pedal and having two apertures therein, one of said apertures engaging the switch arm, the other of said apertures providing a detent opening, a casing secured to said base member, a spring housed in said casing, and a ball yieldingly urged by said spring towards said detent opening.

6. A foot-operated signal device comprising a base member adapted to be secured to the floor of an automotive vehicle, a pedal pivotally mounted on said base member, a switch mounted on said base member, a detent mechanism connected to said base member and adapted to normally index said switch in a neutral position, a switch arm transversely slidable by said pedal for actuating the switch upon manual pivoting of the pedal, and spring means associated with said base member for automatically returning said switch arm to a neutral position upon release of said pedal.

7. A foot-operated direction signal device for mounting on the floor of an automotive vehicle and comprising a base member, a pin journaled in said member, a switch providing a detent mechanism mounted on the forward end of said base member, said switch being provided with an operating arm which is slidable generally transversely to the longitudinal axis of said pin, a pedal pivotally mounted on said pin and having an arm member engaging the operating arm for actuating the switch, and a spring associated with said base member for automatically moving said switch arm from an indicating position to a neutral position.

8. A foot-operated direction signal device for mounting on the floor of a vehicle, said device comprising a base member adapted to be secured to said floor, a pedal pivotally mounted on said base member for limited rotary movement, a switch affixed to said base member and provided with a spring-biased ball, and a plate secured to said pedal for actuating said switch, a portion of said plate being apertured to receive the spring-biased ball.

9. A foot-operated direction signal mechanism comprising a base member adapted to be mounted on the floor of a vehicle, a pin supported by said base member, a pedal pivotally mounted on said pin for limited rotary movement, a switch affixed to said base member and provided with a slidable switch arm and a spring-biased ball, a switch plate secured to said pedal for engaging said switch arm, whereby pivoting of the pedal slides the switch arm to actuate the switch, a portion of said switch plate being apertured to receive the spring-biased ball for indexing said switch in its neutral position.

PAUL L. SCHNEIDER.

References Cited in the file of this patent

UNITED STATES PATENTS

| Number | Name | Date |
|---|---|---|
| 1,585,651 | Colton | May 25, 1926 |
| 1,674,027 | Van Deventer | June 19, 1928 |
| 1,822,706 | McGee | Sept. 8, 1931 |
| 2,293,409 | Smith | Aug. 18, 1942 |
| 2,404,644 | Lowe | July 23, 1946 |
| 2,482,550 | Koertge | Sept. 20, 1949 |

FOREIGN PATENTS

| Number | Country | Date |
|---|---|---|
| 98,005 | Austria | Sept. 25, 1924 |